(12) United States Patent
Lesser et al.

(10) Patent No.: US 7,577,559 B2
(45) Date of Patent: Aug. 18, 2009

(54) APPARATUS FOR TRANSCODING ENCODED CONTENT

(75) Inventors: Richard Lesser, Karlsruhe (DE); Andre Rabold, Ettlingen (DE)

(73) Assignee: Nero AG, Karlsbad (DE)

( * ) Notice: Subject to any disclaimer, the term of this patent is extended or adjusted under 35 U.S.C. 154(b) by 33 days.

(21) Appl. No.: 11/839,189

(22) Filed: Aug. 15, 2007

(65) Prior Publication Data

US 2008/0043834 A1    Feb. 21, 2008

Related U.S. Application Data

(60) Provisional application No. 60/822,469, filed on Aug. 15, 2006.

(30) Foreign Application Priority Data

Dec. 13, 2006   (EP)   ................................. 06025859

(51) Int. Cl.
   *G06F 9/455*   (2006.01)
(52) U.S. Cl. .............................. 703/23; 703/24; 703/25; 703/26; 703/27; 707/1; 707/10; 707/104.1
(58) Field of Classification Search ............. 703/23–27; 707/1, 10, 104.1
   See application file for complete search history.

(56) References Cited

U.S. PATENT DOCUMENTS

| | | | | |
|---|---|---|---|---|
| 6,748,020 | B1 * | 6/2004 | Eifrig et al. | 375/240.26 |
| 6,850,252 | B1 * | 2/2005 | Hoffberg | 715/716 |
| 7,099,873 | B2 * | 8/2006 | Agarwalla et al. | 707/10 |
| 7,209,874 | B2 * | 4/2007 | Salmonsen | 703/23 |
| 7,406,598 | B2 * | 7/2008 | Ducharme | 713/171 |
| 7,505,889 | B2 * | 3/2009 | Salmonsen et al. | 703/23 |
| 2003/0200337 | A1 | 10/2003 | Jabri et al. | |
| 2003/0225723 | A1 | 12/2003 | Agarwalla et al. | |
| 2004/0181550 | A1 * | 9/2004 | Warsta et al. | 707/104.1 |
| 2005/0265395 | A1 | 12/2005 | Kim et al. | |
| 2006/0155723 | A1 * | 7/2006 | Kumar et al. | 707/100 |
| 2006/0173787 | A1 * | 8/2006 | Weber et al. | 705/59 |
| 2007/0005344 | A1 * | 1/2007 | Sandor et al. | 704/9 |
| 2008/0066181 | A1 * | 3/2008 | Haveson et al. | 726/26 |
| 2008/0249946 | A1 * | 10/2008 | Candelore | 705/59 |

* cited by examiner

*Primary Examiner*—Linh V Nguyen
(74) *Attorney, Agent, or Firm*—Michael A. Glenn; Glenn Patent Group

(57) ABSTRACT

An apparatus for transcoding encoded content, the encoded content being encoded using a first coding algorithm, with a first interface for communicating with a content sink, the first interface being adapted for receiving a request for content being encoded using a second coding algorithm and for providing a transcoded content being encoded using the second coding algorithm. The apparatus further has a second interface for communicating with the content source, being adapted for providing a request for the encoded content being encoded using the first coding algorithm and for receiving the encoded content being encoded using the first coding algorithm. The apparatus further has a processing unit being adapted for processing the encoded content being encoded using the first coding algorithm to provide the transcoded content being encoded using the second coding algorithm.

15 Claims, 4 Drawing Sheets

(state of the art)

APPARATUS FOR TRANSCODING ENCODED CONTENT

CROSS-REFERENCE TO RELATED APPLICATIONS

This application claims priority from Provisional U.S. Patent Application Ser. No. 60/822,469, which was filed on Aug. 15, 2006.

TECHNICAL FIELD

The present invention is in the field of content provision to users, within an environment having a large variety of different content formats, as for example available on the world wide web.

BACKGROUND

Nowadays, a large variety of different content formats are known and utilized in different applications. For example referring to audio codecs, several codecs as for example WAVE (WAVE=waveform audio format used by Microsoft Windows and IBM), MPEG4 (MPEG=moving pictures expert group), MP3 (MP3=MPEG-1 layer 3), AAC (AAC=advanced audio coding) etc. are different codecs, making use of different coding algorithms. With respect to mobile applications, i.e. usage of mobile phones, PDA (PDA=personal digital assistant), portable computers, etc. not all available content formats can be supported. This is due to the fact that portable devices lack of processing power and memory resources that advanced content formats necessitate for decoding. As part of the state of the art, a user trying to access content, which is available in a format that is not decodable on the corresponding device, uses a transcoding entity to change the coding algorithm of the desired content to a format that the user can decode on his device. In order to do so the user has to download or to retrieve the desired content, which he cannot decode. Once the content is available on the user's device, the user provides the content to a transcoder, which changes the coding algorithm of the content, and in turn provides the transcoded content to the user.

FIG. 4 illustrates an example of the mechanism described above. FIG. 4 shows a sink 410 trying to access a certain content available at a content source 420. FIG. 4 displays a message sequence chart of the state of the art transcoding procedure. In a first step the sink 410 browses the content directory available from the content source 420. Once the sink 410 has found the desired content, it gets the available resources for the content directory object. Although the resource of the desired content indicates to the sink 410 that it cannot decode the content, it gets the content from the content source 420. Since the sink 410 is not capable of decoding the content, which can for example be due to lacking processing or memory resources, the sink 410 requests a transcoding of the content from the transcoder 430. After the transcoder has acknowledged the transcoding of the content the sink 410 now provides the available content to the transcoder 430, upon which the transcoder 430 can provide the transcoded content to the sink 410.

As indicated by the transcoding example illustrated in FIG. 4, the state of the art procedure necessitates a lot of data transfer. First, the sink 410 has to download the content, although it is not capable of decoding it, then it has to upload the content to the transcoder 430, and finally the transcoder 430 has to upload the transcoded content to the sink 410. The state of the art procedure is very disadvantageous, as it necessitates a huge amount of data transfer, it is very inefficient and very time intensive.

With the state of the art procedures, user satisfaction is very limited. Especially for real-time applications, the state of the art procedure is not feasible.

SUMMARY

According to an embodiment, an apparatus for transcoding encoded content, the encoded content being encoded using a first coding algorithm, may have: a first interface for communicating with a content sink, the first interface being adapted for receiving a request for information on supported source and target formats for providing transcoded content using the first coding algorithm and for providing said information on supported source and target formats for providing transcoded content using the first coding algorithm and for receiving a request for content being encoded using a second coding algorithm and for providing a transcoded content being encoded using the second coding algorithm; a second interface for communicating with the content source, being adapted for providing a request for the encoded content being encoded using the first coding algorithm and for receiving the encoded content being encoded using the first coding algorithm; and a processing unit being adapted for processing the encoded content being encoded using the first coding algorithm to provide the transcoded content being encoded using the second coding algorithm.

According to another embodiment, a method for providing transcoded content to a content sink, the content being encoded using a first coding algorithm, may have the steps of: receiving a request for information on supported source and target formats for providing transcoded content using the first encoding algorithm; providing said information on supported source and target formats for providing transcoded content using the first encoding algorithm; receiving a request for providing the content being encoded using a second coding algorithm from the content sink; requesting a content being encoded using the first coding algorithm from a content source; receiving the content being encoded using the first coding algorithm from the content source; processing the encoded content being encoded using the first coding algorithm for getting transcoded content being encoded using the second coding algorithm; and providing the transcoded content to the content sink.

According to another embodiment, a computer program may have a program code for performing, when the computer program runs on a computer, a method for providing transcoded content to a content sink, the content being encoded using a first coding algorithm, wherein the method may have the steps of: receiving a request for information on supported source and target formats for providing transcoded content using the first encoding algorithm; providing said information on supported source and target formats for providing transcoded content using the first encoding algorithm; receiving a request for providing the content being encoded using a second coding algorithm from the content sink; requesting a content being encoded using the first coding algorithm from a content source; receiving the content being encoded using the first coding algorithm from the content source; processing the encoded content being encoded using the first coding algorithm for getting transcoded content being encoded using the second coding algorithm; and providing the transcoded content to the content sink.

According to another embodiment, a content sink for being provided with transcoded content from a transcoder, may have: a browser for browsing a content directory of a content source and for identifying a desired content; a retriever for retrieving available resources for the desired content from the content source; a getter for getting information on alternative resources from the transcoder; a selector for choosing a desired resource; a requester for requesting a transfer of the transcoded content based on the desired resource; and a receiver for being provided with the transcoded content from the transcoder.

According to another embodiment, a method for being provided with transcoded content from a transcoder, may have the steps of: browsing a content directory of a content source; identifying a desired content; retrieving available resources for the desired content from the content source; getting information on alternative resources from the transcoder; choosing a desired resource; requesting a transfer of the transcoded content based on the desired resource; and being provided with the transcoded content from the transcoder.

The present invention provides an apparatus for transcoding encoded content, the encoded content being encoded using a first coding algorithm, with a first interface for communicating with a content sink, the first interface being adapted for receiving a request for content being encoded using a second coding algorithm and for providing the transcoded content being encoded using the second coding algorithm. The apparatus further comprises a second interface for communicating with a content source, being adapted for providing a request for the encoded content being encoded using the first coding algorithm and for receiving the encoded content being encoded using the first coding algorithm. The apparatus further comprising a processing unit being adapted for processing the encoded content being encoded using the first coding algorithm to provide the transcoded content being encoded using the second coding algorithm.

The present invention further provides a method for providing transcoded content to a content sink, the content being encoded using a first coding algorithm, comprising the step of receiving the request for providing the content being encoded using a second coding algorithm from the coding sink and a step of requesting a content being encoded using the first coding algorithm from a content source. The method further comprising a step of receiving the content being encoded using the first coding algorithm from the content source and processing the encoded content using the first coding algorithm getting transcoded content being encoded using the second coding algorithm. The method further comprises a step of providing the transcoded content to the content sink.

The present invention is based on the finding that an autonomous transcoding unit, to which a content sink requests a certain content in a certain format, can save valuable transmission resources and time by requesting the content directly from a source, the content being encoded using generally any encoding algorithm. As the request from the content sink was directed to the apparatus for transcoding, and the content for transcoding is requested by the apparatus for transcoding, the content not being decodable at the sink only has to be transmitted once from the content source to the apparatus for transcoding. The apparatus for transcoding can then transcode the content immediately and provides the content in the requested format to the content sink.

BRIEF DESCRIPTION OF THE DRAWINGS

Embodiments of the present invention will be detailed utilizing the figures enclosed, of which

DETAILED DESCRIPTION

Figure 1:
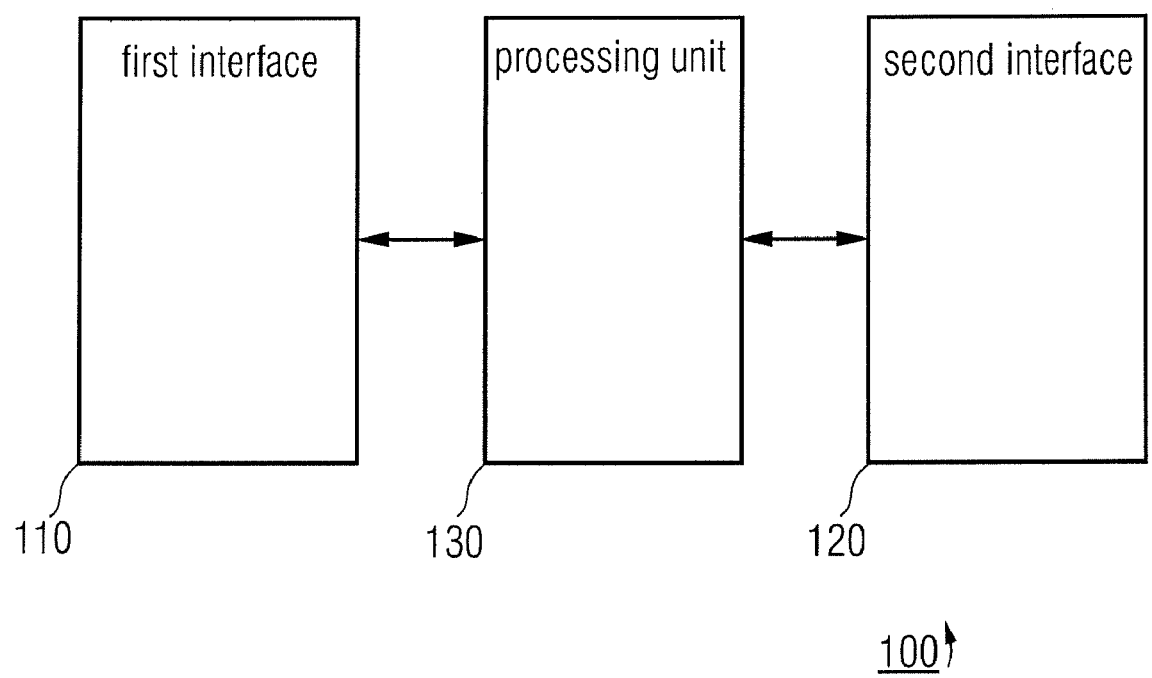
FIG. 1 shows a block diagram of an embodiment of the present invention.

FIG. 1 displays an inventive apparatus 100 for transcoding encoded content, the encoded content being encoded using a first coding algorithm, with a first interface 110 for communicating with a content sink, the first interface 110 being adapted for receiving a request for content being encoded using a second coding algorithm and for providing a transcoded content being encoded using the second coding algorithm. The inventive apparatus 100 further comprises a second interface 120 for communicating with a content source, being adapted for providing a request for encoded content being encoded using the first coding algorithm and for receiving the encoded content being encoded using the first coding algorithm; and the apparatus 100 further comprises a processing unit 130 being adapted for processing the encoded content being encoded using the first coding algorithm to provide the transcoded content being encoded using the second coding algorithm.

In one embodiment of the present invention the processing unit 130 is adapted for decoding the encoded content using the first coding algorithm and for encoding the decoded content using the second coding algorithm yielding the transcoded content.

The inventive apparatus 100 can provide a network service, which is able to perform real-time transcoding and transrating services for other devices within the network, for example personal computers or PDAs. In one embodiment of the present invention the communication of the service, i.e. the inventive apparatus 100, with its clients is handled through the UPnP (UPnP=universal plug and play) protocol. The UPnP protocol is a set of computer network protocols promulgated by the UPnP forum. The goals of UPnP are to allow services to connect seamlessly and to simplify the implementation of networks in the home, as far as for example data sharing, communications, and entertainment is concerned, as well as in corporate environments. UPnP achieves this by defining and publishing UPnP device control protocols built upon open, internet-based communication standards. The UPnP architecture offers pervasive peer-to-peer network connectivity of PCs (PC=personal computer), intelligent appliances, and wireless devices. The UPnP architecture is a distributed, open networking architecture that uses TCP/IP (TCP=transfer control protocol, IP=internet protocol) and HTTP (HTTP=hypertext transfer protocol) to enable seamless proximity networking in addition to control and data transfer among networked devices in the home, office, and everywhere in between.

More information about the UPnP can be found at HTTP://upnp.org.

The transcoding service is a "vendor specific service" in terms of the UPnP standard device control protocol (DCP=device control protocol) specification available through the UPnP forum. The service is announced and offered through one or more UPnP devices in the network, as in one embodiment of the present invention the Nero Media-Home. It enables UPnP media renderer devices and UPnP media players to access content available in formats which are not natively supported by the devices themselves. The decoding service offers methods for transferring the original content from the device providing it, called "source" in the following context, through the device hosting the transcoding service, i.e. the inventive apparatus 100 called "transcoder", to the device requesting it, called sink in the following context.

Figure 2:
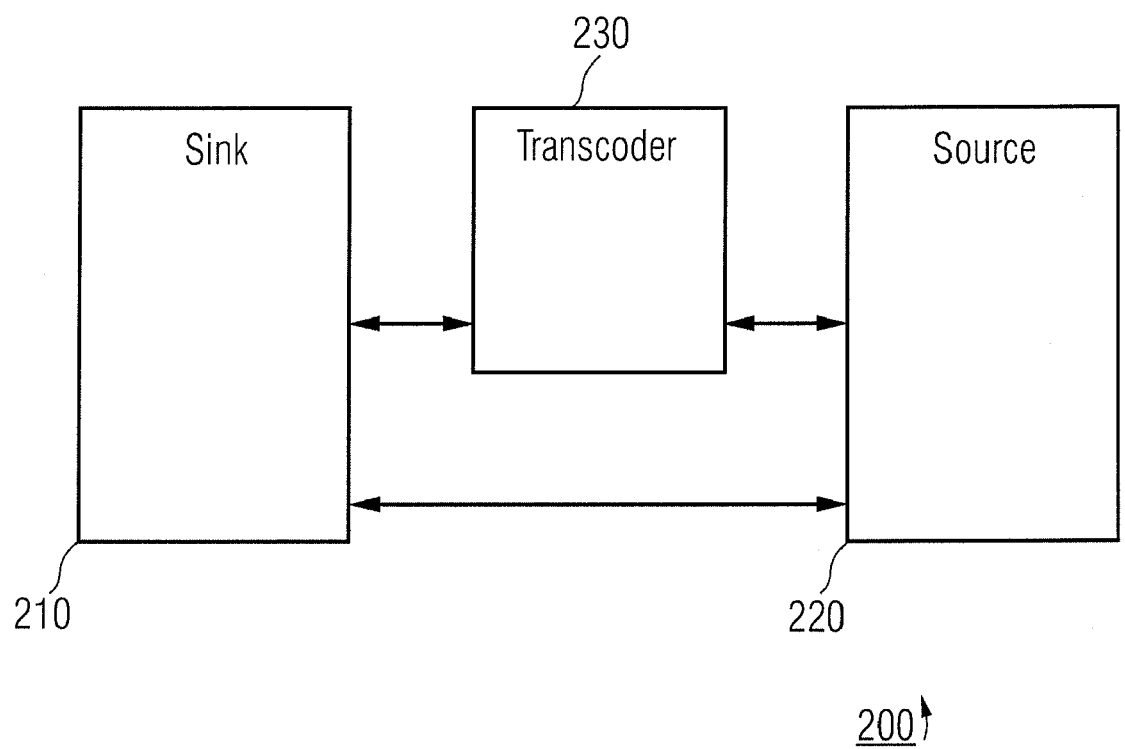
FIG. 2 shows an embodiment of a network where the inventive apparatus can be utilized.

FIG. 2 illustrates an according network scenario 200. The network scenario 200 comprises a content sink 210, a content source 220 and a transcoder 230. In embodiments of the present invention the inventive apparatus 100 is comprised in the transcoder 230, realizing an inventive apparatus 100 for transcoding, where the first interface 110 or the second interface 120 can be adapted for communicating through UPnP protocol.

As indicated by the double-sided arrows in FIG. 2, information is transferred between the three network entities. While the transfer is performed the format of the original content might get real-time transcoded or transrated by the transcoder device. In other words, the transcoder 230 device is proxying the content from the source 220 device and is able to convert it to different formats in real-time during transfer to the sink 210 device.

According to embodiments of the present invention as source 220 device all UPnP media servers are applicable, especially including but not restricted to so-called DMS (DMS=digital media server) devices following the DLNA (DLNA=digital living network alliance) v1.5 guidelines, which can for example be found at http://dlna.org. Sink 210 devices can be implemented as UPnP media renderers and UPnP control points are applicable, especially including but not restricted to so called DMR (DMR=digital media renderer) and DMP (DMP=digital media player) devices following the DLNA v1.5 guidelines.

The transcoder 230, i.e. the inventive apparatus 100, can in one embodiment be implemented as the Nero MediaHome product. The service provided by the transcoder 230 is mainly targeted for low performance source 220 and sink 210 devices, which are not able to perform the transcoding operation on their own. Many devices, as for example PDAs, mobile phones, portable computers, etc. are not able to carry out the transcoding operation by themselves, for example due to limited memory or low CPU (CPU=central processing unit) performance in embedded systems or networked consumer electronic devices. The present invention provides the advantage that these devices can now rely upon a third component, i.e. the inventive apparatus 100, transparently handling the transcoding process whenever needed.

The discovery of the transcoding service on the transcoder 230 device is fully handled by UPnP device specification. This means that the transcoder 230 device is multicasting SSDP (SSDP=simple service discovery protocol) "notify" packets in regular intervals and is answering accordingly if it receives a SSDP "discover" packet. In other embodiments of the present invention the device discovery might not be limited solely to UPnP but extended to other protocols and network infrastructures in the future as for example WLAN (WLAN=wireless local area network) or bluetooth.

The transcoding service itself offers different actions allowing the sink 210 to retrieve information about which source and target formats are supported. For each supported source format, as for example WAVE audio (WAVE=waveform audio format used by Microsoft Windows and IBM) a distinct set of target formats, as for example MPEG-4 (MPEG=moving pictures expert group), AAC (AAC=advanced audio coding), or MPEG-1 layer 3, might be supported. The list of supported source and target formats is dependent upon the capability of the transcoding service implementation and is not scope of the present invention. In general all conceivable formats can be supported.

After both the sink 210 and the transcoder 230 have negotiated a format in which the source content will be transcoded while transferred, the sink 210 could for example initiate the transfer via an HTTP GET request to the transcoder 230 device. The transcoder 230 device on its part will open a HTTP connection to stream the original content from the source 220 device in one embodiment of the present invention.

Figure 3:
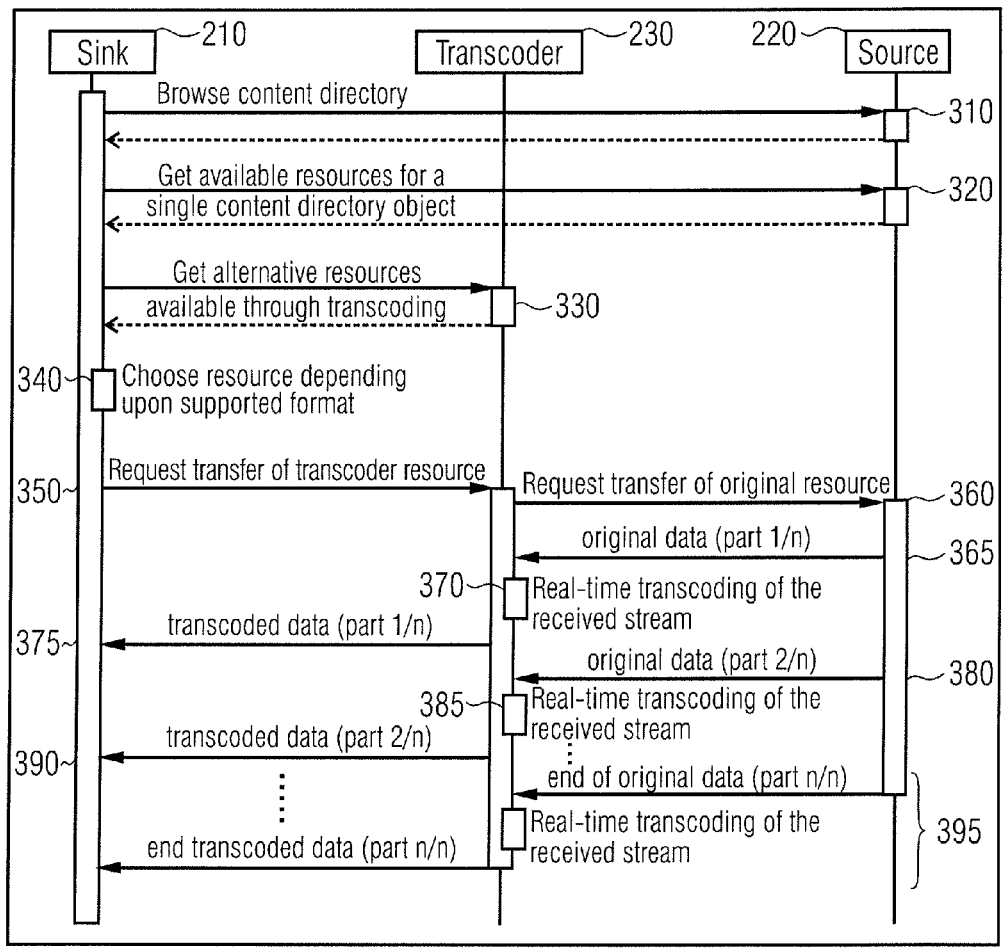
FIG. 3 shows a message sequence chart as an embodiment of the inventive method.
Figure 4:
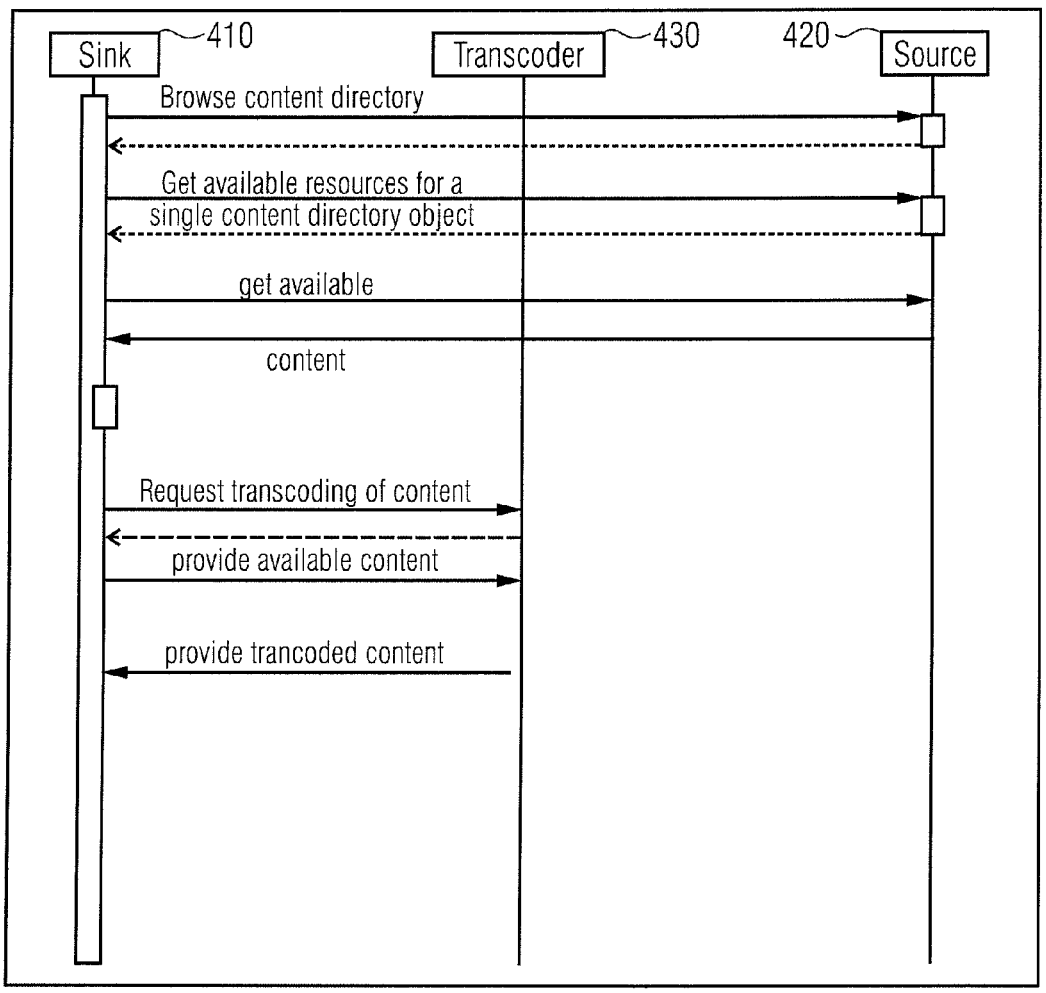
FIG. 4 shows the state of the art transcoding procedure.

FIG. 3 shows the mechanism in detail. In FIG. 3 the sink 210, the source 220 and the transcoder 230 are displayed. Furthermore, FIG. 3 shows a message sequence chart of an exemplified communication between these three network entities. In a first step 310 the sink 210 browses the content directory of the source 220 in order to identify a desired content. Once the desired content was identified, the sink 210 needs to retrieve the available resources for the desired content from the source 220. This is carried out in the second step 320 where the sink 210 gets available resources for a single content directory object from the source 220. In the third step 330 the sink 210 can get information from the transcoder 230, on what alternative resources are available for transcoding. The next step 340 comprising the sink 210 making up a choice on the desired resource depending upon the supported formats. After the sink 210 has chosen the format, it can issue a request for the transfer of transcoded content to the transcoder 230, which is indicated in step 350 in FIG. 3. Once the transcoder 230 has received the request from the sink 210 it issues a request to the source 220 for transfer of the original source in a step 360. The source 220 then provides the first part of the original data to the transcoder 230 in step 365, upon which the transcoder 230 starts real-time transcoding of the received data part in step 370. After the first data part has been transcoded in step 370, the transcoder 230 can provide the first transcoded data part to the sink 210 in step 375. In the meantime, or in another embodiment of the present invention also after that, the source 220 can provide the second data part in a step 380 to the transcoder 230, which in turn starts the real-time transcoding of the second received data part in a step 385. The real-time transcoded data can then be provided to the sink 210 in a step 390. The procedure continues until the last data packet is provided from the source 220 to the transcoder 230, which real-time transcodes the last data packet and also provides it to the sink 210 which is indicated in the step 395 in FIG. 3.

It is an advantage of the present invention that the source 220 device does not need to know about any of the mechanisms mentioned as part of the description of FIG. 3. After the sink 210 device has chosen the best fitting format all further requests are handled via the transcoder 230 device as it would be the sink 210 itself. So the transcoder 230 becomes sink 210 from the source 220 point of view and the source 220 from the sink 210 point of view.

The present invention provides the advantage that devices, which are not capable of carrying out transcoding of formats, can receive transcoded content in real-time. Another advantage of the present invention is, that in general devices do not need to keep an updated database of different coding algorithms. Nowadays new coding algorithms are developed frequently, and the according decoders and encoders need to be updated frequently. With the inventive apparatus 100, a central transcoding entity is provided, which can serve as a content source to network devices, in one embodiment of the present invention transcoding all conceivable content formats into a single format, which would be the advantageous format of a network entity requesting the content.

Depending on certain implementation requirements of the inventive methods, the inventive methods can be implemented in hardware or in software. The implementation can be performed using a digital storage medium, in particular a disc, DVD or a CD having electronically readable control signals stored thereon, which cooperate with a programmable computer system such that the inventive methods are performed. Generally, the present invention is, therefore, a computer program product with a program code stored on a machine-readable carrier, the program code being operative for performing the inventive method when the computer program product runs on a computer. In other words, the inventive methods are, therefore, a computer program having a program code for performing at least one of the inventive methods when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for transcoding encoded content, the encoded content being encoded using a first coding algorithm, comprising:
   a first interface for communicating with a content sink, the first interface being adapted for receiving a request for information on supported source and target formats for providing transcoded content using the first coding algorithm and for providing said information on supported source and target formats for providing transcoded content using the first coding algorithm and for receiving a request for content being encoded using a second coding algorithm and for providing a transcoded content being encoded using the second coding algorithm;
   a second interface for communicating with the content source, being adapted for providing a request for the encoded content being encoded using the first coding algorithm and for receiving the encoded content being encoded using the first coding algorithm; and
   a processing unit being adapted for processing the encoded content being encoded using the first coding algorithm to provide the transcoded content being encoded using the second coding algorithm.

2. The apparatus of claim 1, wherein the processing unit is adapted for decoding the encoded content using the first coding algorithm and for encoding the decoded content using the second coding algorithm yielding the transcoded content.

3. The apparatus of claim 1, wherein the first interface is adapted for communicating through the UPnP protocol or the second interface is adapted for communicating through the UPnP protocol.

4. The apparatus of claim 1, wherein the first interface or the second interface is adapted for multicasting SSDP-notify packets.

5. The apparatus of claim 1, wherein the first or the second interface is adapted for receiving and reacting to SSDP-discover packets.

6. The apparatus of claim 1, further comprising an interface for a wireless network.

7. The apparatus of claim 1, wherein the first interface is adapted for receiving an HTTP GET request from the content sink and for streaming the transcoded content to the sink.

8. The apparatus of claim 1, wherein the second interface is adapted for establishing a streaming HTTP connection with the content source.

9. The apparatus of claim 1, wherein the processing unit is adapted for providing the transcoded content in real-time.

10. The apparatus of claim 1, being implemented as part of a Nero MediaHome product.

11. The apparatus of claim 1, wherein the second interface is adapted for being provided with a first and a second part of the encoded content being encoded with the first coding algorithm,
   the processing unit being adapted for processing the first and the second part of the encoded content being encoded using the first coding algorithm to provide a first and a second part of encoded content being encoded using the second coding algorithm,
   the first interface being adapted for providing the first and the second part of the encoded content being encoded using the second coding algorithm to the content sink, and
   the second interface being further adapted for being provided with the second part of the encoded content being encoded using the first coding algorithm while or after the processing unit processing the first part of the encoded content being encoded using the first coding algorithm or the first interface providing the first part of the encoded content being encoded using the second coding algorithm.

12. A method for providing transcoded content to a content sink, the content being encoded using a first coding algorithm, the method comprising:
   receiving a request for information on supported source and target formats for providing transcoded content using the first encoding algorithm;
   providing said information on supported source and target formats for providing transcoded content using the first encoding algorithm;
   receiving a request for providing the content being encoded using a second coding algorithm from the content sink;
   requesting a content being encoded using the first coding algorithm from a content source;
   receiving the content being encoded using the first coding algorithm from the content source;
   processing the encoded content being encoded using the first coding algorithm for getting transcoded content being encoded using the second coding algorithm; and
   providing the transcoded content to the content sink.

13. A computer program stored on a computer readable medium comprising a program code for performing, when the computer program runs on a computer, a method for providing transcoded content to a content sink, the content being encoded using a first coding algorithm, the method comprising:
   receiving a request for information on supported source and target formats for providing transcoded content using the first encoding algorithm;
   providing said information on supported source and target formats for providing transcoded content using the first encoding algorithm;
   receiving a request for providing the content being encoded using a second coding algorithm from the content sink;
   requesting a content being encoded using the first coding algorithm from a content source;
   receiving the content being encoded using the first coding algorithm from the content source;

processing the encoded content being encoded using the first coding algorithm for getting transcoded content being encoded using the second coding algorithm; and providing the transcoded content to the content sink.

14. A content sink for being provided with transcoded content from a transcoder, comprising:
- a browser for browsing a content directory of a content source and for identifying a desired content;
- a retriever for retrieving available resources for the desired content from the content source;
- a getter for getting information on alternative resources from the transcoder;
- a selector for choosing a desired resource;
- a requester for requesting a transfer of the transcoded content based on the desired resource; and
- a receiver for being provided with the transcoded content from the transcoder.

15. A method for being provided with transcoded content from a transcoder, comprising:
- browsing a content directory of a content source;
- identifying a desired content;
- retrieving available resources for the desired content from the content source;
- getting information on alternative resources from the transcoder;
- choosing a desired resource;
- requesting a transfer of the transcoded content based on the desired resource; and
- being provided with the transcoded content from the transcoder.

* * * * *